US008103212B1

(12) United States Patent
Pezeshkian et al.

(10) Patent No.: US 8,103,212 B1
(45) Date of Patent: Jan. 24, 2012

(54) RELAY DEVICE DEPLOYER SYSTEM

(75) Inventors: Narek Pezeshkian, San Diego, CA (US); Aaron Bruce Burmeister, San Diego, CA (US); Hoa G. Nguyen, San Diego, CA (US); Kevin F. Holz, San Diego, CA (US); James Cruickshanks, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 421 days.

(21) Appl. No.: 12/535,416

(22) Filed: Aug. 4, 2009

Related U.S. Application Data

(63) Continuation-in-part of application No. 11/832,103, filed on Aug. 1, 2007.

(51) Int. Cl.
*H04B 7/185* (2006.01)

(52) U.S. Cl. .......... 455/13.1; 455/7; 455/11.1; 455/420; 455/67.11

(58) Field of Classification Search ............. 455/7, 11.1, 455/13.1, 3.05, 414.1, 420, 456.2, 9, 16, 455/41.2, 513, 515, 69, 522, 63.4, 67.11, 455/552.1, 556.1, 562.1, 115.1, 115.3, 99, 455/575.7
See application file for complete search history.

(56) References Cited

U.S. PATENT DOCUMENTS

| 3,288,402 | A |   | 11/1966 | Icenbice et al. |        |
|-----------|---|---|---------|-----------------|--------|
| 4,635,311 | A | * | 1/1987  | Helmke          | 14/2.5 |
| 7,000,357 | B1| * | 2/2006  | Stearns et al.  | 52/110 |
| 7,391,356 | B2| * | 6/2008  | Brumley et al.  | 342/13 |
| 7,746,265 | B2| * | 6/2010  | Brumley et al.  | 342/13 |
| 2002/0008667 | A1 | * | 1/2002 | Nguyen et al.  | 343/715 |
| 2003/0041329 | A1 | * | 2/2003 | Bassett        | 725/105 |
| 2004/0134662 | A1 | * | 7/2004 | Chitwood et al.| 166/367 |
| 2005/0036622 | A1 | * | 2/2005 | Hay et al.     | 380/270 |
| 2007/0063886 | A1 | * | 3/2007 | Brumley et al. | 342/13 |
| 2008/0155064 | A1 | * | 6/2008 | Kosuge et al.  | 709/219 |
| 2009/0135046 | A1 | * | 5/2009 | Steele et al.  | 342/27 |
| 2010/0259436 | A1 | * | 10/2010| Brumley et al. | 342/14 |

OTHER PUBLICATIONS

H. G. Nguyen, N. Pezeshkian, M. Raymond, A. Gupta, J. M. Spector; Autonomous Communication Relays for Tactical Robots; Proceedings of ICAR 2003, The 11th International Conference on Advanced Robotics Coimbra, Portugal, Jun. 30-Jul. 3, 2003.
Hoa G. Nguyen, Nathan Farrington, and Narek Pezeshkian; Maintaining Communication Link for Tactical Ground Robots; AUVSI Unmanned Systems North America 2005, Anaheim, CA, Aug. 3-5, 2004.
Unpublished U.S. Appl. No. 11/832,103, filed Aug. 1, 2007, by Aaron Burmeister et al., titled "Relay Device Deployer System."

(Continued)

*Primary Examiner* — Tan Trinh
(74) *Attorney, Agent, or Firm* — Kyle Eppele; J. Eric Anderson

(57) ABSTRACT

A relay device deployment system comprising: a deployer, a wireless relay device, a node radio, a deployment mechanism, and a processor. The deployer is configured to be mounted on a mobile platform and to deploy the relay device to a support surface. The relay device comprises dual rotatable antennas and operates as a node in an ad hoc telecommunications network. The node radio has dual antennas and is also configured to operate as a node in the network. The deployment mechanism is configured to deploy the relay device when the network strength drops below a threshold value as monitored by the processor.

4 Claims, 16 Drawing Sheets

OTHER PUBLICATIONS

Unpublished U.S. Appl. No. 11/832,065, filed Aug. 1, 2007, by Aaron Burmeister et al., titled "Wireless, Self-Contained Relay Device."

Unpublished U.S. Appl. No. 12/503,170, filed Jul. 15, 2009, by Narek Pezeshkian et al., titled "Next Generation Automatically-Deployed Communication Relay" Navy Case No. 99526.

Sarnoff Corporation; Tactical Military Communications for Subterranean & Urban Environments (CSUE); available on the internet at: http://www.sarnoff.com/downloads/research-and-development/video-communications-networking/communications-networking/ad-hoc-networking/CSUE_military_ds.pdf; believed to have been posted on the internet on Nov. 10, 2007.

N. Pezeshkian, H. G. Nguyen, and A. Bumeister; Unmanned Ground Vehicle Radio Relay Deployment System for Non-Line-of-Sight Operations; 13th IASTED International Conference on Robotics & Applications, Wurzburg, Germany; Aug. 29-31, 2007.

* cited by examiner

RELAY DEVICE DEPLOYER SYSTEM

CROSS-REFERENCE TO RELATED APPLICATION

This application is a continuation-in-part of U.S. patent application Ser. No. 11/832,103, filed 1 Aug. 2007 by Burmeister et al.

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 99917.

BACKGROUND OF THE INVENTION

Maintaining communications between mobile platforms in non-line-of-sight conditions can be problematic. Buildings, trees, hills, and other obstructions negatively reflect, distort, and/or absorb radio signals. A need exists for a system to deploy wireless, non-line-of-sight, relay devices to preserve communications between mobile platforms.

BRIEF DESCRIPTION OF THE DRAWINGS

Throughout the several views, like elements are referenced using like references. Figures are not drawn to scale.

DETAILED DESCRIPTION OF EMBODIMENTS

Figure 1:
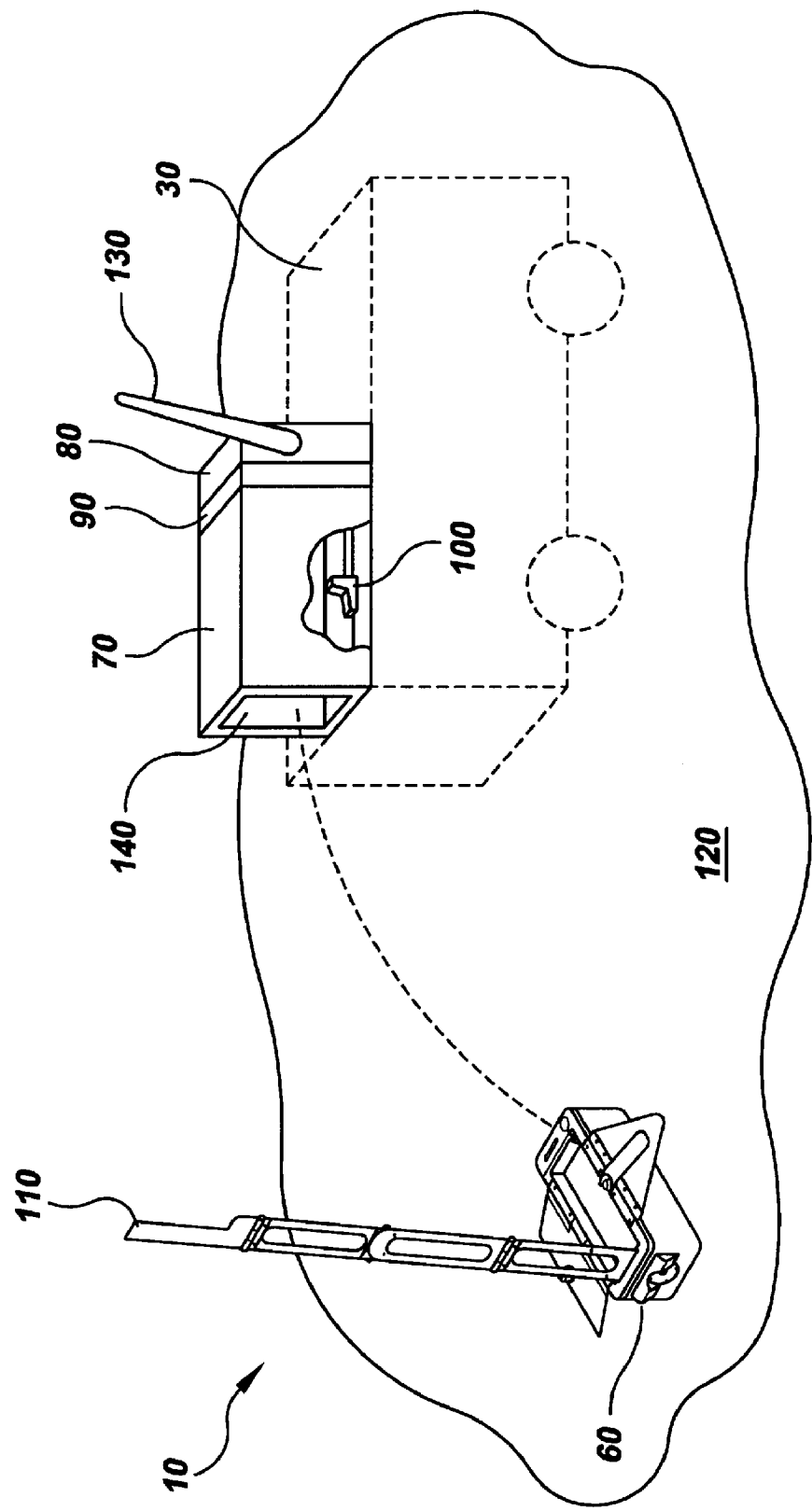
FIG. 1 shows an embodiment of a relay device deployment system.
Figure 5:
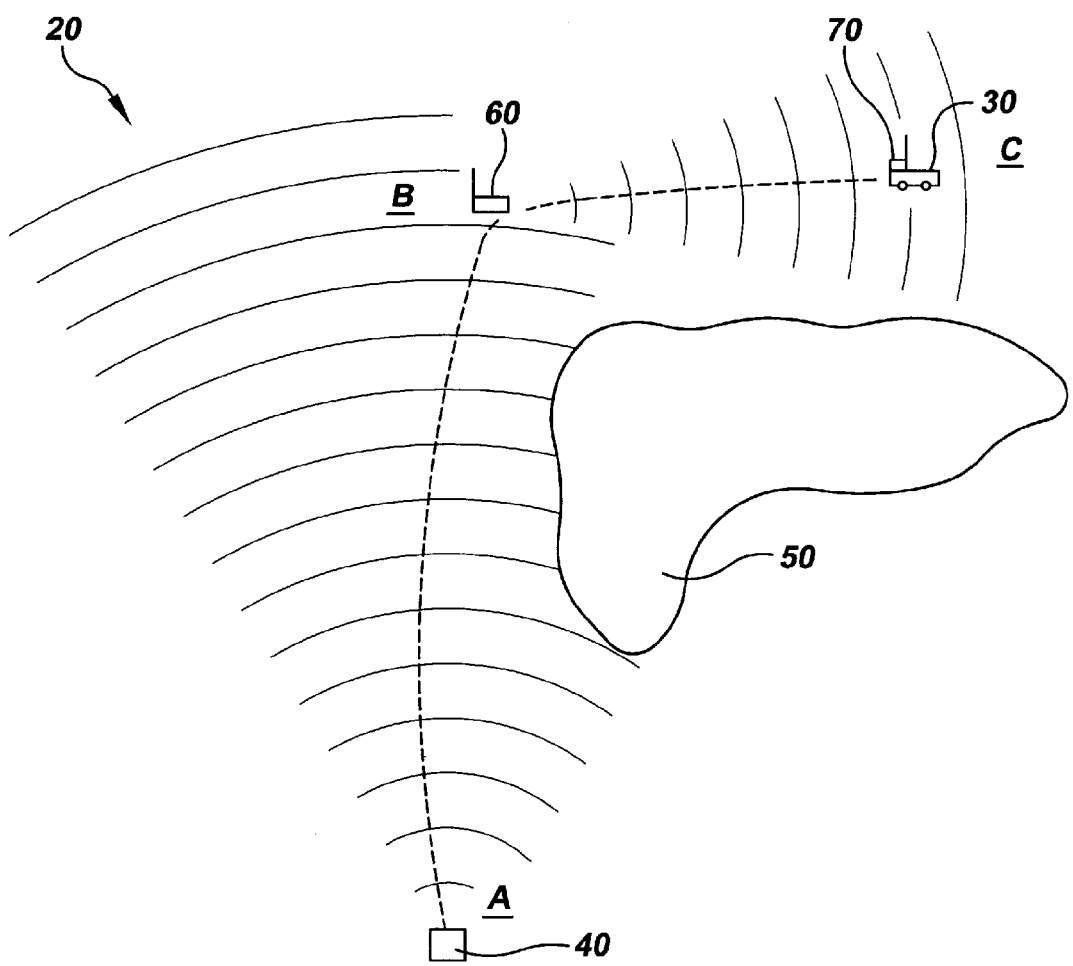
FIG. 5 shows an ad hoc telecommunications network being maintained between a base station and a mobile platform in the presence of an obstacle.

The relay device deployment system 10, shown in FIG. 1, is a system that allows for an ad hoc telecommunications network 20 to be maintained between a mobile platform 30 and a base station 40, as shown in FIG. 5. Obstacles 50, also shown in FIG. 5, between the base station 40 and the mobile platform 30 cause the signal strength A of the network 20 to diminish. System 10 is configured to automatically deploy a relay device 60 from the mobile platform 30 once the signal strength A reaches a predetermined threshold value X. The relay device 60 is configured to operate as a node in the network 20, thus preserving the network 20 between the mobile platform 30 and the base station 40.

FIG. 1 shows an embodiment of system 10 comprising a relay device 60 and a deployer 70. The deployer 70 is configured to be mounted on the mobile platform 30 and to stow the relay device 60. The deployer 70 comprises a radio 80, a processor 90, and a deployment mechanism 100. The radio 80 and the relay device 60 are each configured to operate as nodes in the network 20, as shown in FIG. 5 and described below. Upon receiving a command from the processor 90, the deployment mechanism 100 is configured to deploy the relay device 60. The processor 90 is operatively coupled to the radio 80 and the deployment mechanism 100. The processor 90 is configured to monitor the signal strength A of the network 20 and to send a command to the deployment mechanism 100 to deploy the relay device 60 when the signal strength A drops below a threshold value X. The relay device 60, comprising an extendable antenna 110, is self-righting, self-contained, and wireless. The relay device 60 is configured to be deployed from the deployer 70 to a support surface 120. The support surface 120 may be the ground, the floor of a building, the surface of the water, or any other surface capable of supporting the relay device 60.

The deployer 70 may be any size or shape capable of stowing a relay device 60 and of being mounted on the mobile platform 30. The deployer 70 may be mounted to any surface of the mobile platform 30, top, bottom, front, back, or sides. The mobile platform 30 may be any land or water-surface-based platform capable of locomotion. Examples of the mobile platform 30 include, but are not limited to the following: a human; an animal; land-based vehicles, both manned and unmanned (autonomous & radio-controlled); and water craft, both manned and unmanned (autonomous & radio-controlled). Also shown in FIG. 1 is a deployer antenna 130, operatively coupled to the radio 80, and a relay bay 140 configured for stowing the relay device 60. The radio 80 may be any radio capable of operating as a node in an ad hoc telecommunications network 20. An example of the radio 80 is a PC Card 802.11b radio and a small single-board computer (such as Bright Star Engineering's™ nanoEngine™, utilizing Intel's® StrongARM™ processor) both coupled to a radio interconnect board. FIG. 1 shows the deployment mechanism 100 as a spring-loaded launcher, but it is to be understood that the deployment mechanism 100 may be any mechanism capable of deploying the relay device 60 from the deployer 70 to the support surface 120. The processor 90 may be any processor that is capable of monitoring the signal strength A in the network 20 and of sending a signal to deploy the relay device 60 when the signal strength A drops below a threshold value X.

Figure 2:
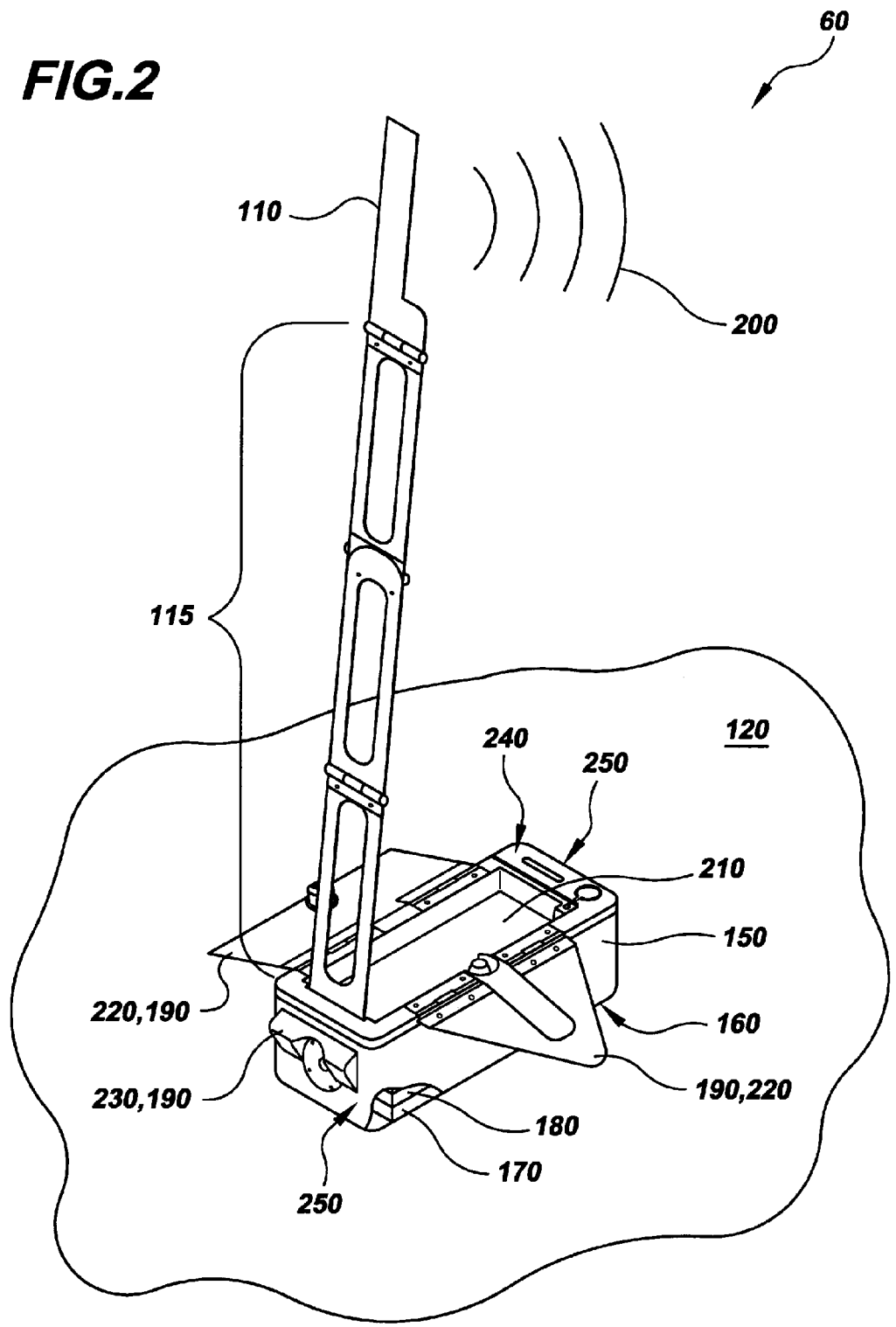
FIG. 2 shows an embodiment of a relay device.

FIG. 2 shows one embodiment of a relay device 60. In this embodiment, the relay device 60 comprises an extendable antenna 110 atop a mast 115, a housing 150, a bottom surface 160, an internal radio 170, a relay processor 180, and a self-righting mechanism (SRM) 190. The housing 150 of the relay device 60 rests on the bottom surface 160. The internal radio 170 is configured to relay RF signals 200 and to operate as a node in the network 20, as described in greater detail hereafter with regards to FIG. 5. Although the housing 150 is shown in FIG. 2 as being a generally rectangular prism, it is to be understood that the housing 150 may be any size or shape having sufficient internal volume to house the internal radio 170, and the relay processor 180. The housing 150 may be constructed of any material capable of forming a water-tight compartment to house the internal radio 170, and the relay processor 180. Example housing 150 materials include, but are not limited to: steel, titanium, aluminum, carbon fiber, fiberglass, thermoset plastic, and thermoplastic such as acrylonitrile butadiene styrene (ABS). The relay device 60 may also be ruggedized such that the relay device 60 continues to function properly after being subjected to shock forces resulting from being deployed from the mobile platform 30. In one embodiment the relay device 60 may withstand shock forces of up to 125 gs. The relay processor 180 is mounted within the housing 150 and is operatively coupled to the internal radio 170 and the SRM 190. In one embodiment, the relay device 60 may be powered by Li-ion batteries with onboard high-efficiency DC-DC converters, all mounted within the housing 150.

The embodiment of the relay device 60 shown in FIG. 2 shows the extendable antenna 110 in an extended position with the mast 115 fully extended. The antenna 110 may be any antenna capable of receiving and transmitting signals over the network 20. Example embodiments of the antenna 110 include, but are not limited to, monopoles, dipoles, fractals, and antenna arrays. For example, the antenna 110 may be half wavelength dipole antenna with a gain of 2 dBi. The antenna 110 is operatively coupled to the internal radio 170. The mast 115 may be any structure capable of supporting the antenna 110. In the embodiment of the relay device 60 shown in FIG. 2, the mast 115 is separated into three hinged segments. Each hinged segment is connected to the adjoining segment by a spring-loaded hinge. An antenna bay 210 for stowing the antenna 110 and mast 115 is also shown in FIG. 2. In the embodiment shown in FIG. 2, bay doors 220, which are part of the SRM 190, are configured to enclose the collapsed mast 115 and the antenna 110 in the antenna bay 210. Once the spring-loaded bay doors/SRM 190 have been released from a collapsed position the relay device 60 rights itself, as shown in FIG. 3, and the spring-loaded mast 115 extends the antenna 110 into the extended position.

The embodiment of the SRM 190 shown in FIG. 2 utilizes bay doors 220 of the antenna bay 210 as well as geometric constraints 230 built into the housing 150 to right the relay device 60. In the embodiment shown in FIG. 2, the bay doors 220 are mounted to the housing 150 by hinges on opposite outer edges of an upper surface 240 of the housing 150. The bay doors 220 have a closed position, as shown in FIG. 1, where one bay door 220 lies generally flush with the upper surface 240 of the housing and the other bay door 220 lies underneath the aforementioned bay door 220. In the embodiment shown in FIG. 2, the hinges of the bay doors 220 are spring-loaded such that when released from their closed position, the bay doors 220 force the housing 150 to come to rest on its bottom surface 160 by interacting with the support surface 120 on which the housing 150 rests, as shown below in FIG. 3. In the embodiment depicted in FIGS. 1 and 2, the housing 150 is generally a right rectangular prism and further comprises two end surfaces 250 that are perpendicular to the axis of rotation of the hinges of the bay doors 220. The geometric constraints 230, as shown in the embodiment of FIG. 2, are protrusions, which may be mounted, molded, or carved to the end surfaces 250. The geometric constraints 230 prevent the relay device 60 from resting on either of its end surfaces 250. For example, if the relay device 60 is dropped from the mobile platform 30 the SRM 190 is configured to reposition the housing 150 from any initial position to an upright position. In the upright position, the bottom surface 160 of the housing 150 rests on the support surface 120.

Figure 3:
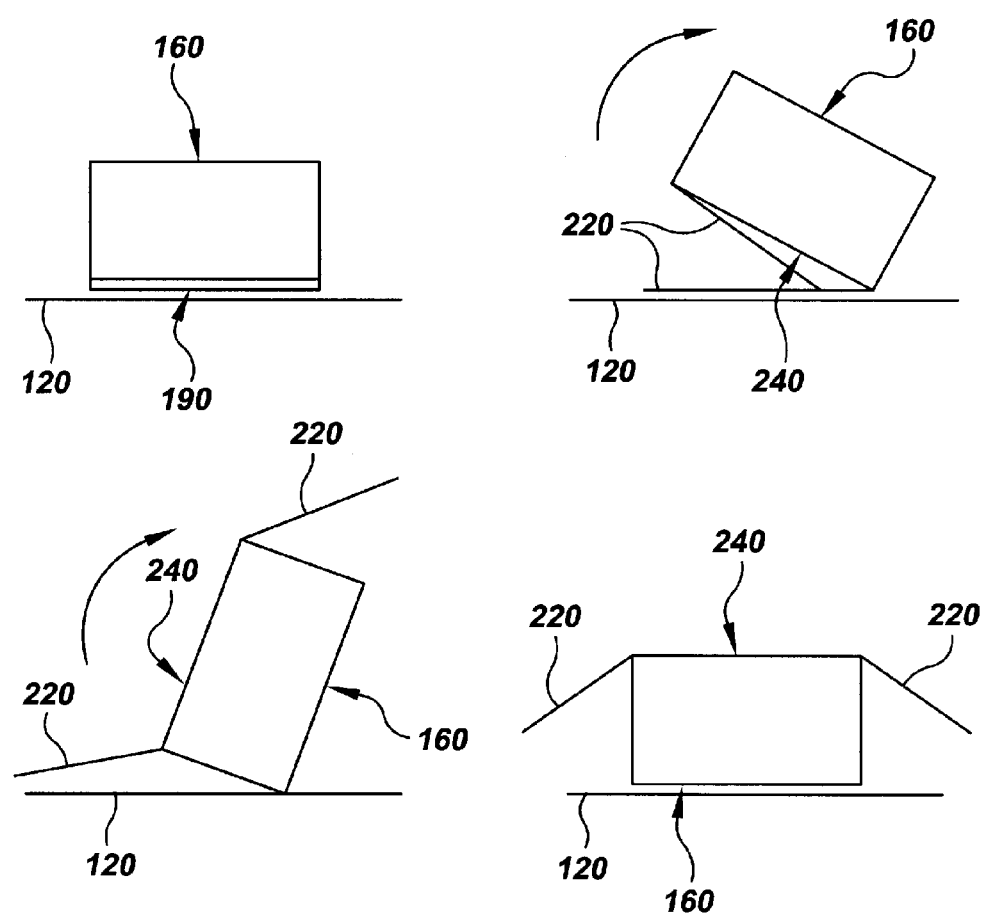
FIG. 3 shows a relay device self-righting itself.

FIG. 3 is a series of drawings showing the relay device 60 righting itself from an upside-down position. As shown, the relay device 60 starts from an initial position where the upper surface of the relay device 60 rests on the support surface 120. In this embodiment, upon a command from the relay processor 180, the SRM 190 pushes the relay device 60 into an upright position with the bottom surface 160 resting on the support surface 120. The SRM 190 is not limited to the embodiment shown in FIG. 3, but may be any mechanism incorporated into relay device 60 that is capable of righting the relay device 60 from any initial position. In the embodiment of the relay device 60 depicted in FIG. 3, the support surface 120 may be any solid surface over which the mobile platform 30 may move and which is capable of supporting the relay device 60.

Figure 4:
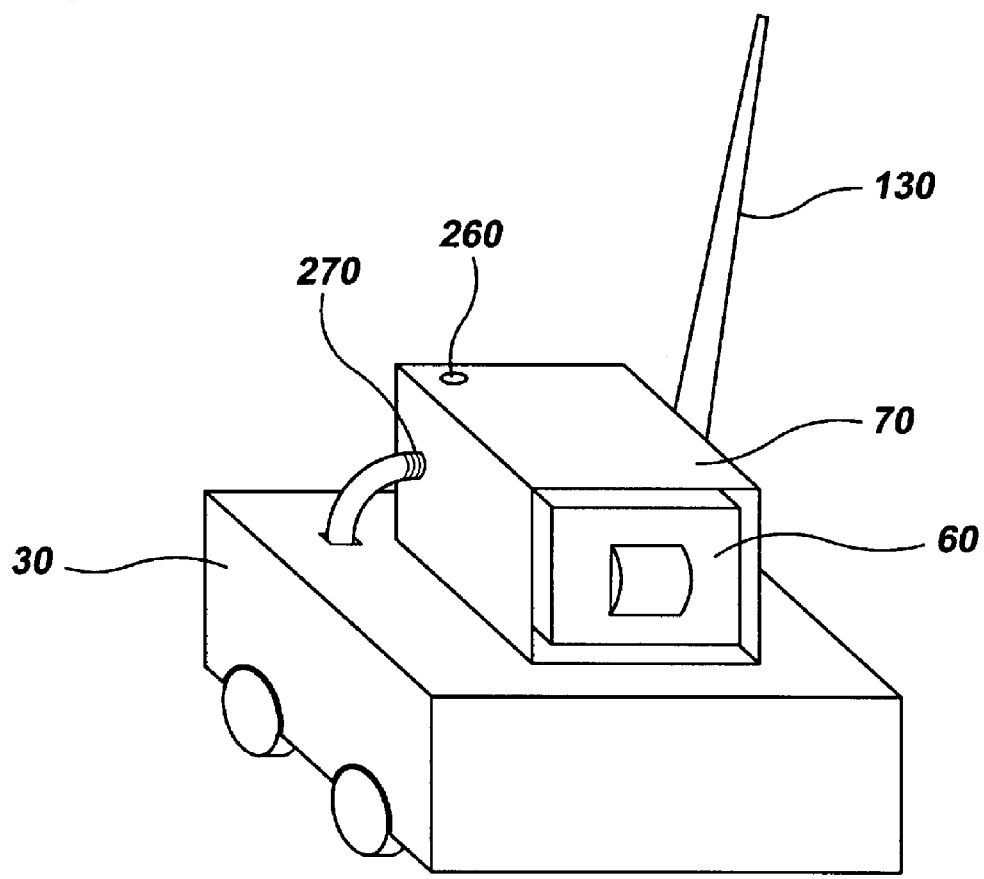
FIG. 4 shows an embodiment of a relay device deployment system with a stowed relay device on a mobile platform.

FIG. 4 shows the system 10 with a stowed relay device 60 mounted to a mobile platform 30. Also shown in FIG. 4, is a manual release button 260 on the deployer 70 configured to release the stowed relay device 60 when pressed by a user. The deployer 70 is also shown as being communicatively coupled to the mobile platform 30 via an Ethernet interface port 270.

FIG. 5 shows how the system 10 may be used to maintain contact between the mobile platform 30 and the base station 40 in the presence of obstacles 50. The mobile platform 30 traveling from position A towards position B maintains line of sight (LOS) communications with the base station 40. However, as the mobile platform 30 begins to travel from position B to position C, radio communications begin to be obstructed by obstacle 50. Example embodiments of obstacle 50 include, but are not limited to buildings, trees, hills, or any other physical or nonphysical obstructions that negatively reflect, distort, and/or absorb radio signals. The base station 40 may be any stationary or mobile site capable of being a node in the network 20. For example, the base station 40 may be, but is not limited to, a vehicle-mounted control center, a man-portable control center, or a control center in a building. FIG. 5 shows how a relay device 60 may be placed in the vicinity of position B to allow the mobile platform 30 to continue around obstacle 50 towards position C without losing radio connectivity with the base station 40.

Figure 6:
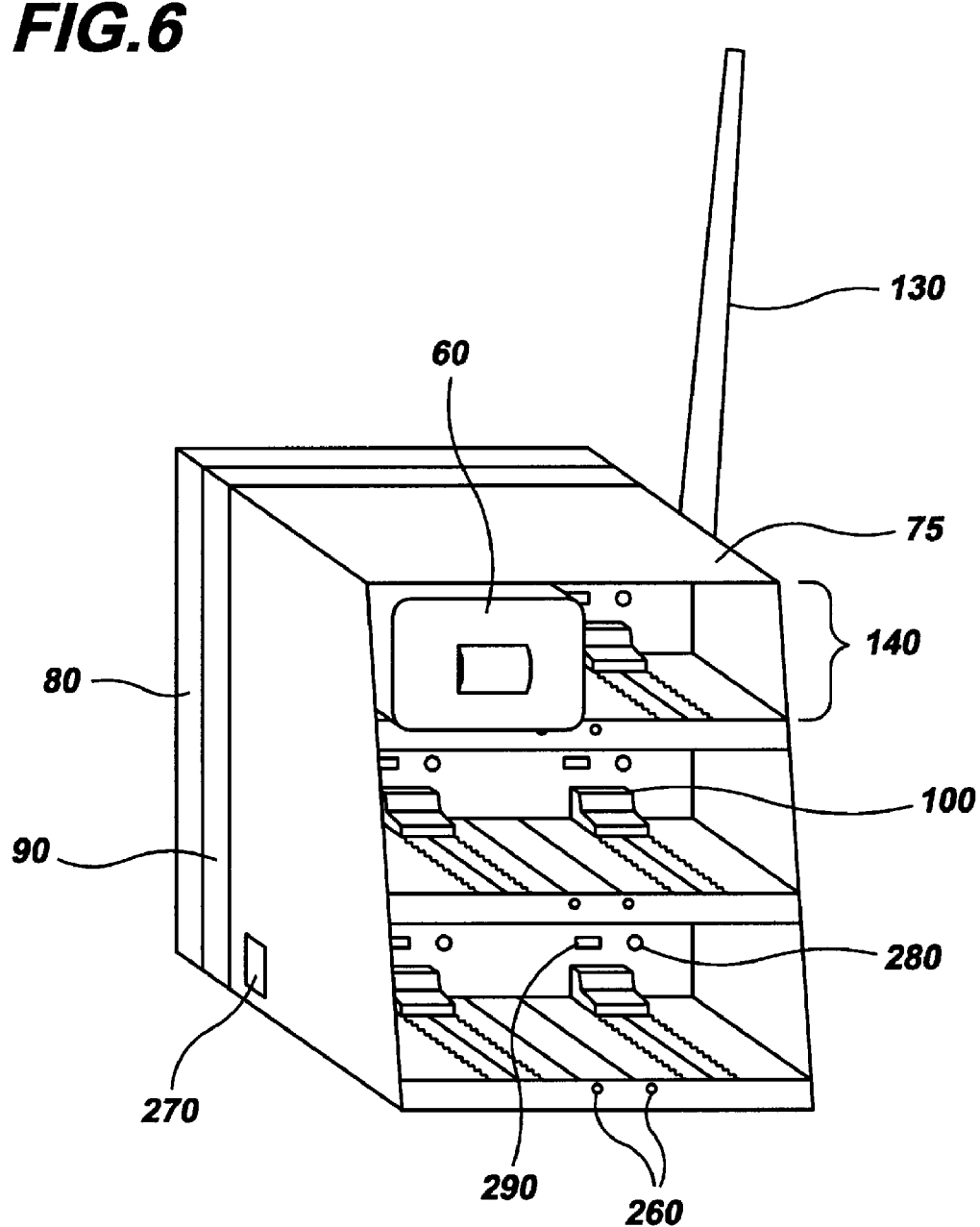
FIG. 6 shows an embodiment of the relay device deployment system with a multi-bay deployer.

FIG. 6 depicts another embodiment of system 10 comprising a multi-bay deployer 75 that is configured to stow multiple relay devices 60 in multiple relay bays 140. Only one relay device 60 is shown in FIG. 6 for the sake of clarity. Also shown in FIG. 6, are a deployment detection sensor 280 and a magnetic field generator 290, both mounted within each relay bay 140 and operatively coupled to the processor 90. Each relay device 60 may have an internal magnetic activation switch (not shown) configured to switch in the absence of a local magnetic field, thus activating the relay device 60. The processor 90 may be configured to activate a relay device 60 in any given relay bay 140 by manipulating a local magnetic field with the corresponding magnetic field generator 290. The deployment detection sensor 280 is configured to send a signal to the processor 90 upon detecting the absence of the relay device 60 in its corresponding relay bay 140. Each relay bay 140 may have a corresponding deployment detection sensor 280, deployment mechanism 100, and manual release button 260. Although the multi-bay deployer 75 is shown in FIG. 6 as having 6 relay bays 140, it is to be understood that the multi-bay deployer 75 is not limited to 6 relay bays 140, but may have any number of relay bays 140 and corresponding relay devices 60.

In the embodiment of system 10 shown if FIG. 6, the multi-bay deployer 75 is configured to operate as a node in network 20. The multi-bay deployer 75 is configured to be physically and communicatively coupled to the mobile platform 30. In operation, the processor 90 activates one of the stowed relay devices 60. The processor 90 then monitors the signal strength A of the network 20, while ignoring the signal emanating from the stowed, activated relay device 60. Once the signal strength A reaches the predetermined threshold value X the processor 90 sends a signal to the deployment mechanism 100. Upon receiving the signal from the processor 90, the deployment mechanism 100 then deploys the activated relay device 60 to the support surface 120, over which the mobile platform 30 may be traveling. Once the relay device 60 has been deployed, the self-righting mechanism 190 moves the relay device 60 into an upright position and the antenna 110 extends. The deployed relay device 60 then operates as a new node in the network 20. This procedure may be repeated until each relay device 60 that is stowed in the multi-bay deployer 75 has been deployed.

Figure 7:
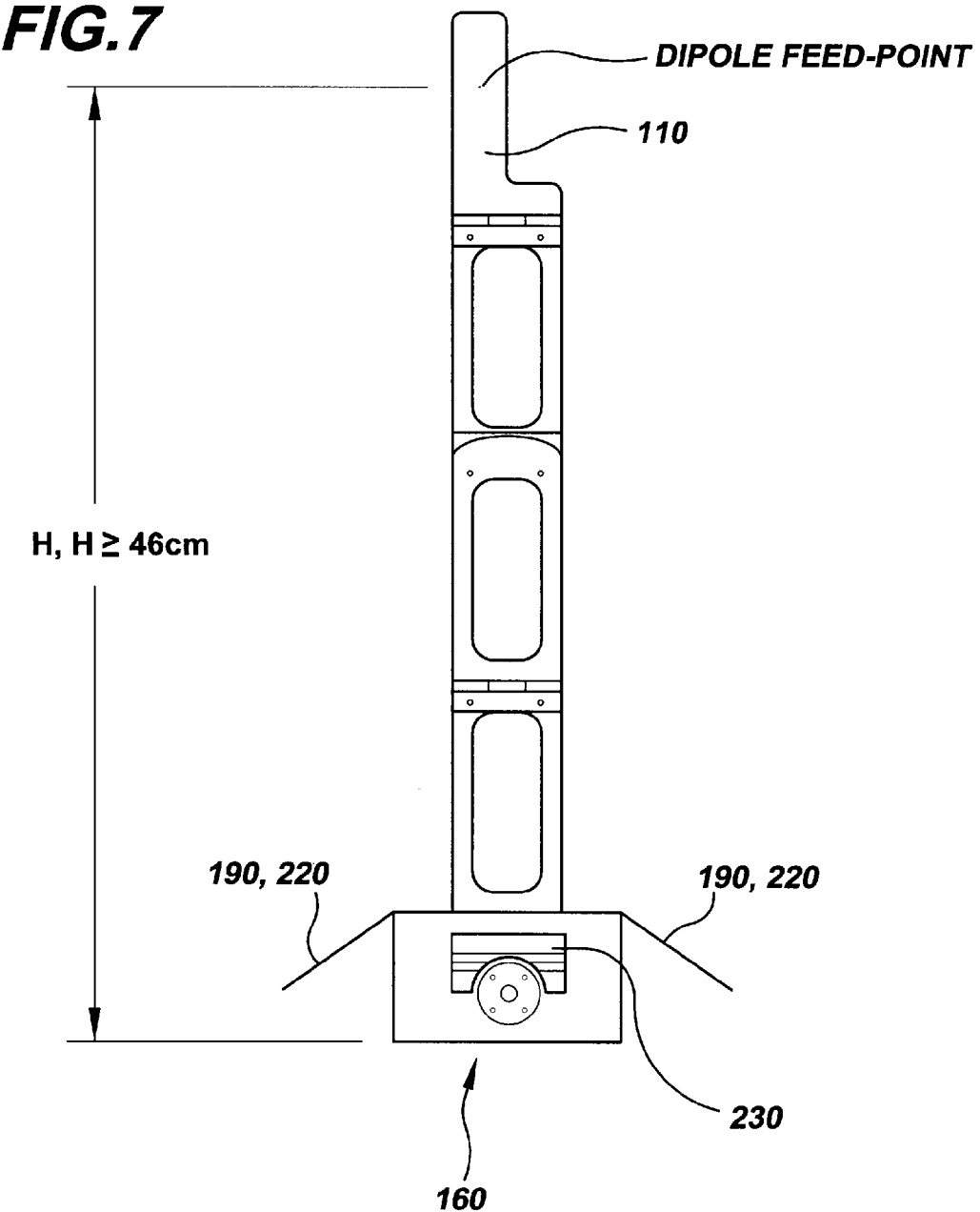
FIG. 7 shows a front view of the relay device with an extended antenna.

FIG. 7 shows one embodiment of the relay device 60 where the antenna 110 is a dipole antenna with a height H (defined as the distance from the dipole feed-point to the bottom surface 160) that is greater than or equal to about 46 centimeters (18 inches). For example, the antenna 110 may be a half-wavelength antenna with a 2 dBi gain and a height H of about 50 centimeters (about 20 inches). In the latter example, the coupling strength between the antenna 110 and another network 20 node about 400 meters (about 437 yards) away would exceed about −114 dBm.

Figure 8:
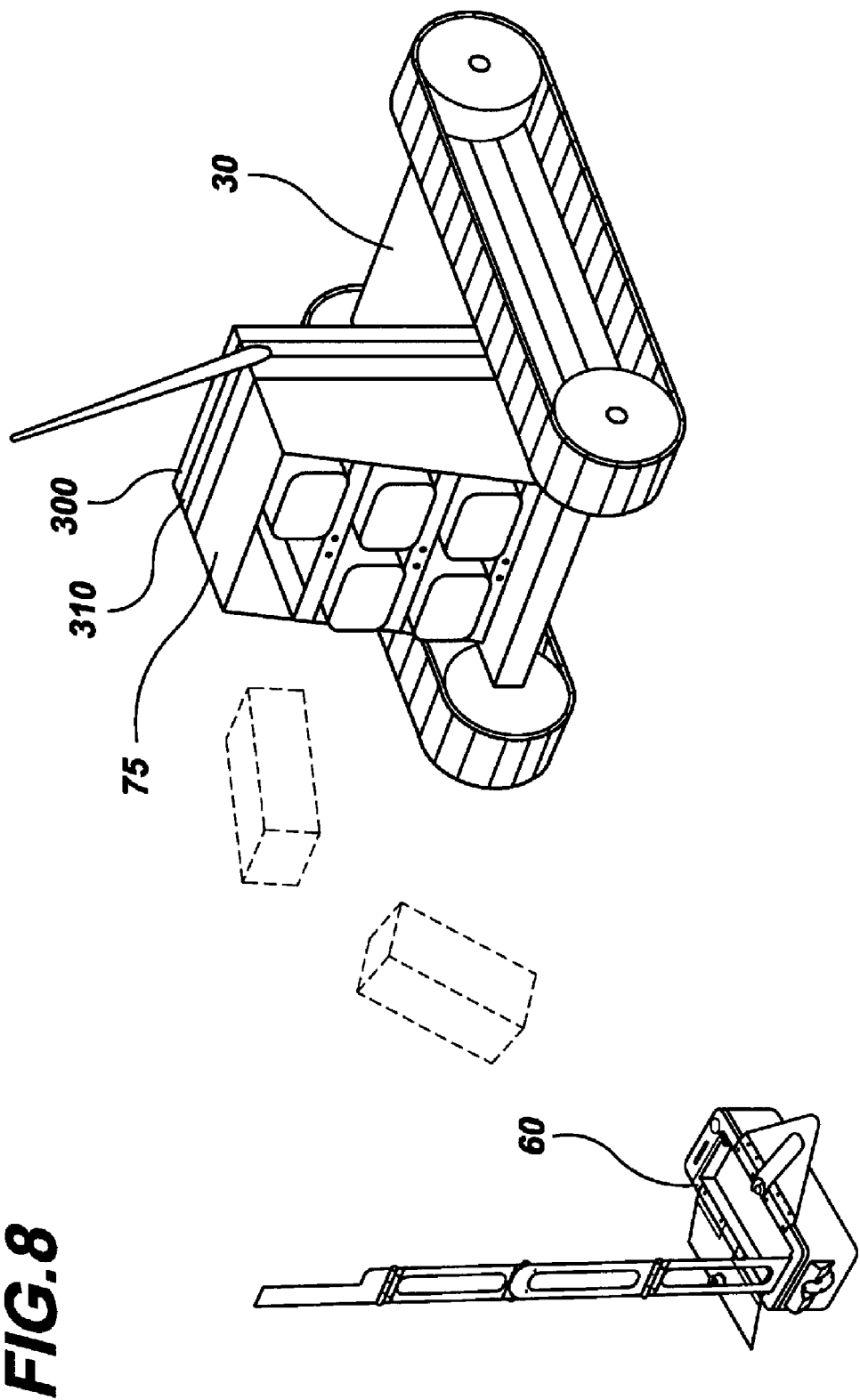
FIG. 8 shows an embodiment of the relay device deployment system mounted to an unmanned mobile platform.

FIG. 8 shows an alternate embodiment of system 10 wherein the processor 90 comprises a first processor 300 and a second processor 310 communicatively coupled to each other. In this embodiment, the first processor 300 is configured to communicate over the network 20, to monitor the signal strength A, and to send a signal to the second processor 310 when the signal strength A drops below the threshold value X. The first processor 300 is also configured to receive relay device 60 status information from the second processor 310. The second processor 310 is operatively coupled to the deployment mechanism 100, the magnetic field generator 290, and the deployment detection sensor 280. The second processor 310 is configured to interpret commands sent by the first processor 300 and to communicate relay device 60 deployment status to the first processor 300. For example, upon receiving a signal from the first processor 300 that the threshold value X has been reached, the second processor 310 would then cause the deployment mechanism 100 to deploy a pre-activated relay device 10. If the relay device 60 was properly deployed from the relay bay 140, the deployment detection sensor 280 would send a signal to the second processor 310 indicating that it no longer detects a relay device 60 in the corresponding relay bay 140. The second processor 310 would then communicate to the first processor 300 that the deployment was successful. The first processor 300 would then, in turn, communicate to the base station 40 that a relay device 60 has been successfully deployed.

In the multi-bay deployer 75 embodiment of system 10, after a successful deployment of a relay device 60, the second processor 310 would then cause a magnetic field generator 290 to manipulate a local magnetic field in its corresponding relay bay 140 to cause the corresponding relay device 60 to activate. The second processor 310 would then communicate to the first processor 300 that it has attempted to activate another relay device 60. The first processor 300 would then monitor the network 20 to see if a signal from the stowed, activated relay device 60 can be detected. If the first processor 300 cannot detect a signal from the stowed, activated relay device 60, the first processor 300 will instruct the second processor 310 to activate and prepare to deploy a different stowed relay device 60. Then the first processor 300 will send status information to the base station 40 as to whether or not the stowed relay device 60 successfully activated.

Figure 9:
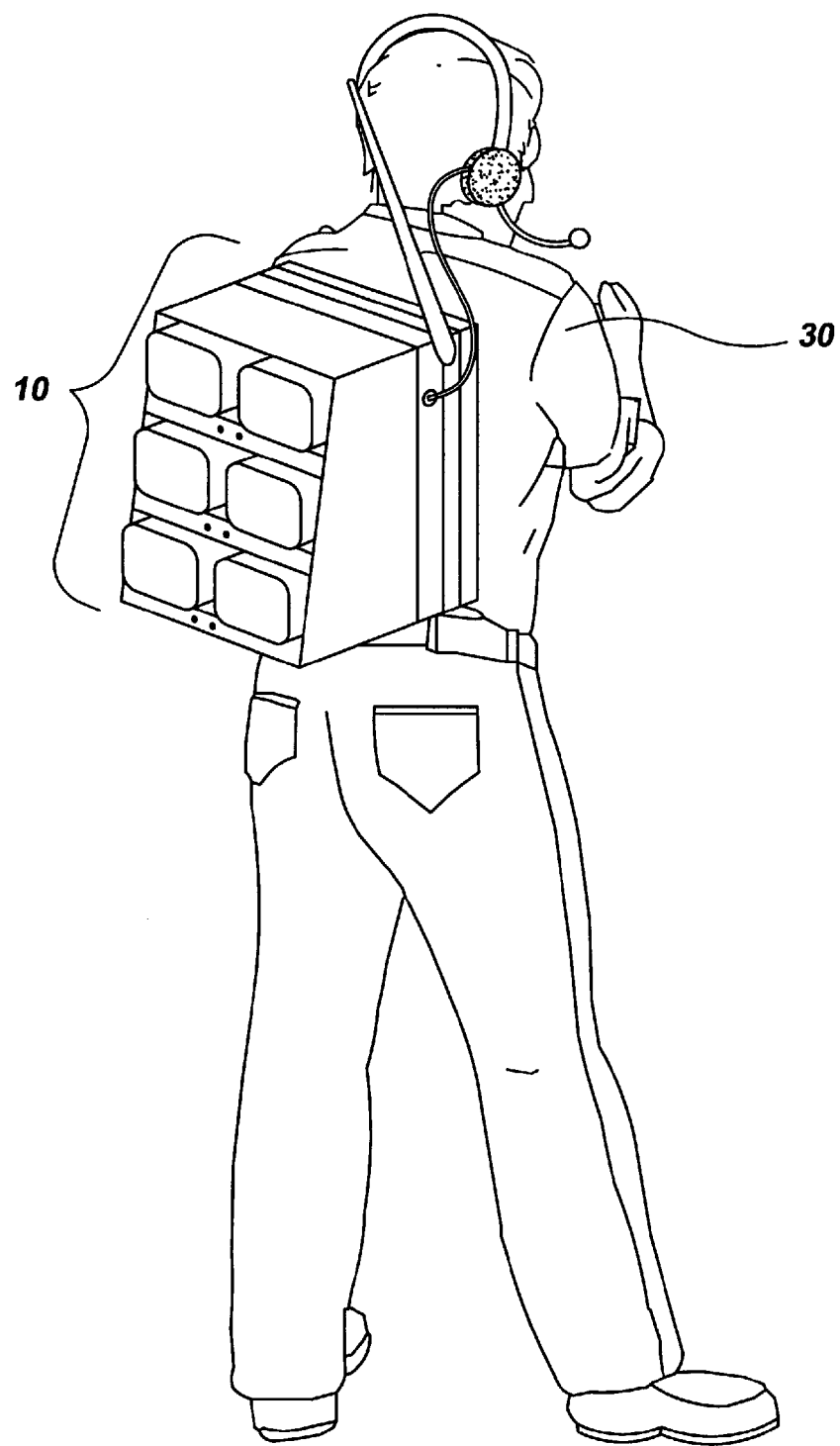
FIG. 9 shows an embodiment of the relay device deployment system carried by a person.

FIG. 9 depicts a person as the mobile platform 30 carrying system 10. Although FIG. 9 shows the mobile platform 30 (the person) carrying system 10 on his/her back, it is to be understood that system 10 may be mounted in any location on mobile platform 30. For example, a smaller version of system 10 may be mounted to a shoe, another article of clothing, or even held in a hand.

Figure 10:
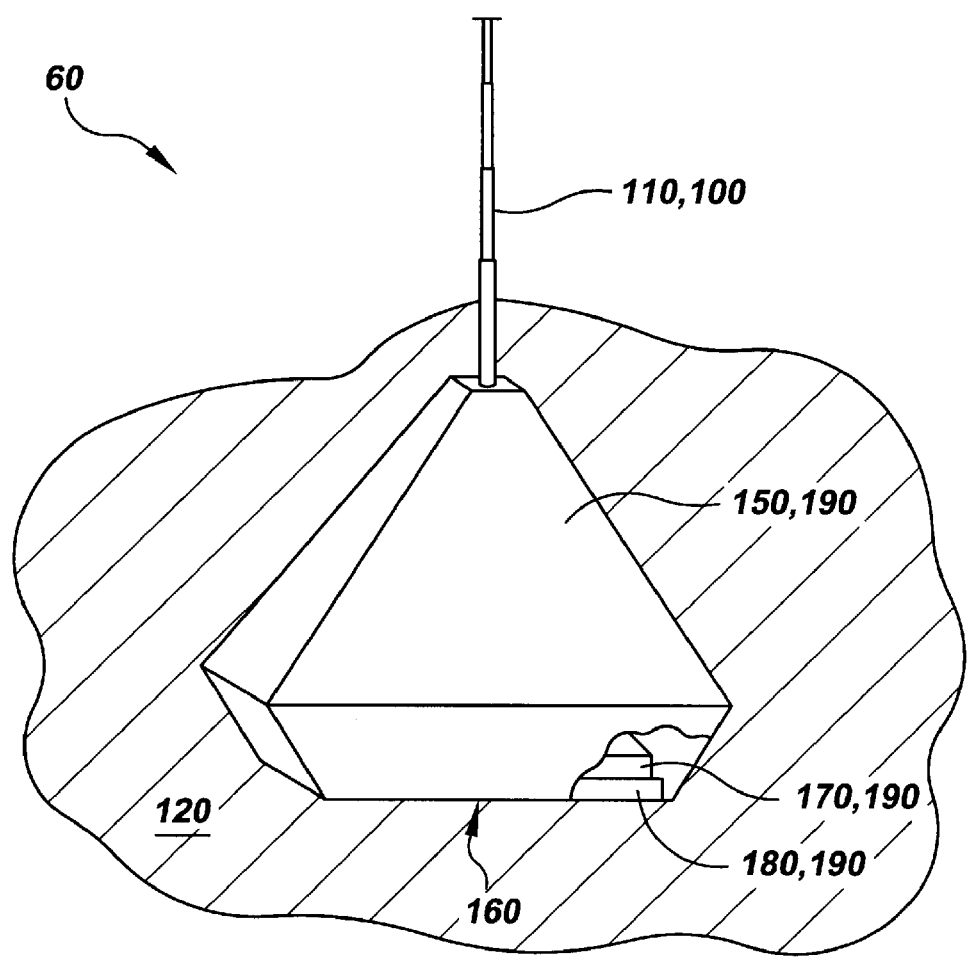
FIG. 10 shows another embodiment of the relay device.

FIG. 10 shows another embodiment of the relay device 60. In this embodiment, the self-righting mechanism 190 is a combination of the shape of the housing 150 and the placement of the relay processor 180, the internal radio 170, and any other supporting electronics. With the relay processor 180 and the internal radio 170 being mounted inside the housing 150 near the bottom surface 160, the shape of the housing 150 causes the relay device 60 to rest on a support surface 120 in an upright position in the presence of gravitational forces. In this embodiment, the antenna 110 is shown as a telescoping antenna in a fully extended position. In its collapsed position, the antenna 110 may fit inside the housing 150. The antenna 110 may be internally spring-loaded and double as the deployment mechanism 100. This embodiment of the relay device 60 may be watertight, float on a liquid support surface 120, or rest on a solid support surface 120.

Figure 11:
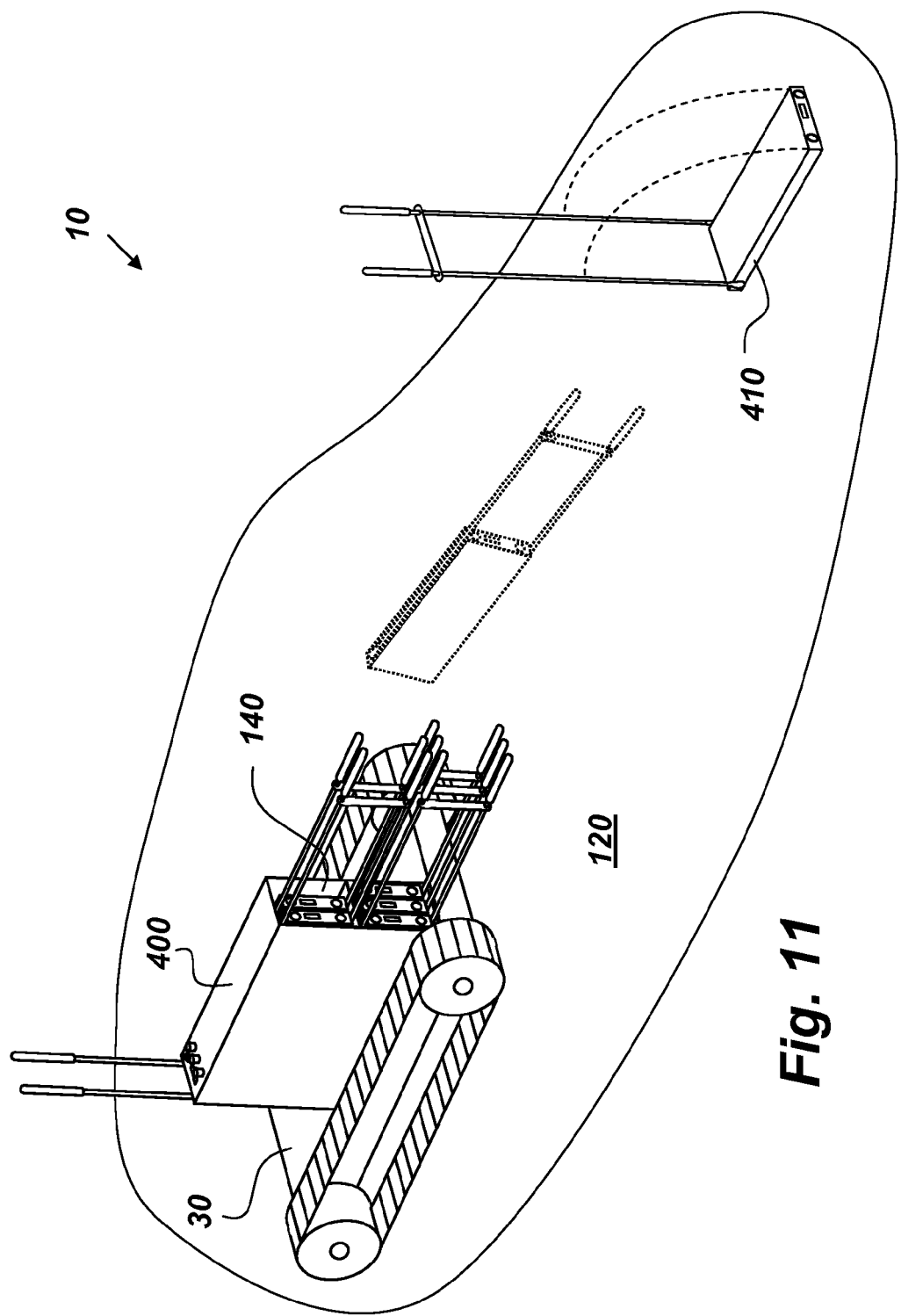
FIG. 11 shows another embodiment of the relay device deployer system.
Figure 12:
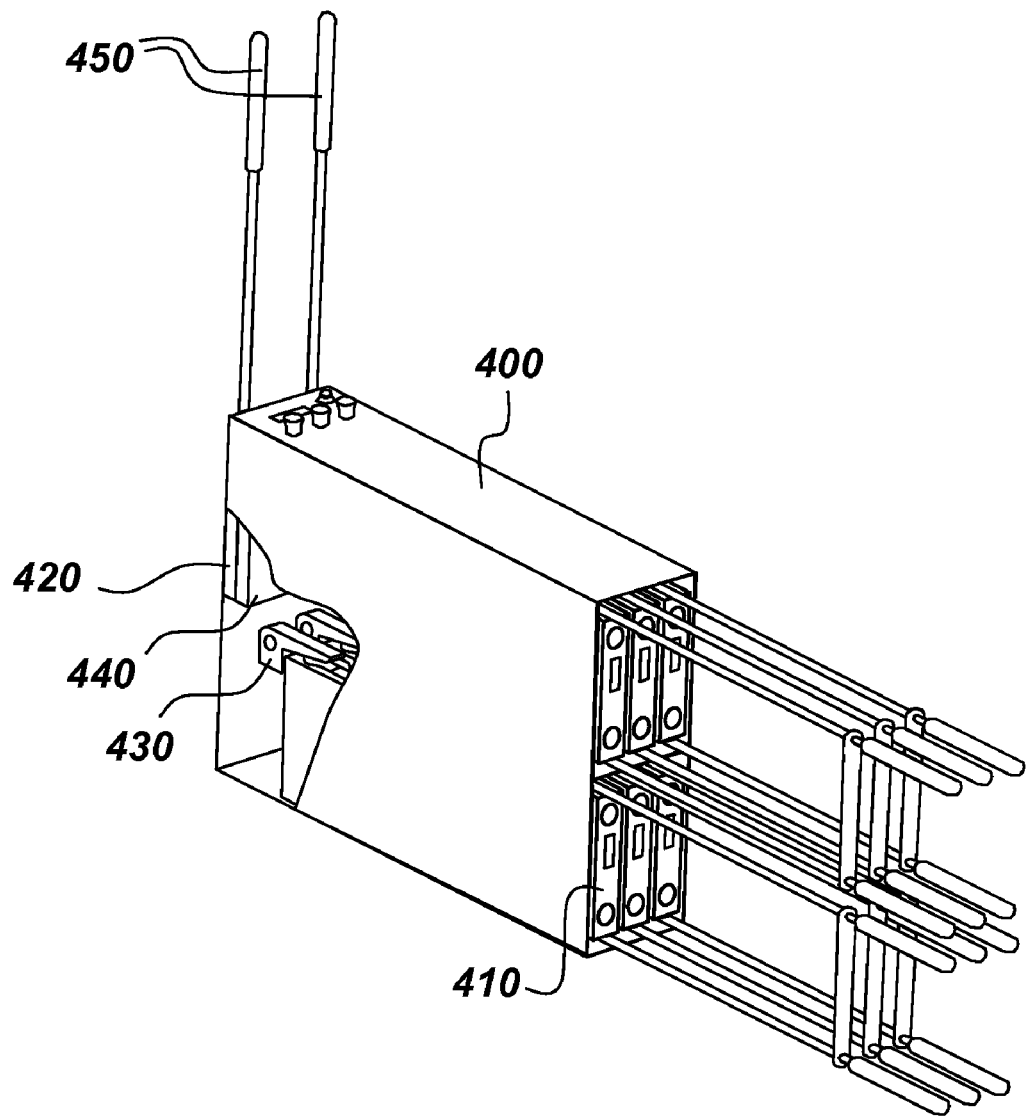
FIG. 12 shows a perspective, cut-away view of the deployer.

FIGS. 11 and 12 show an alternate embodiment of the relay device deployment system 10 comprising a deployer 400, a wireless relay device 410, a node radio 420, a deployment mechanism 430, and a processor 440. The deployer 400 is configured to be mounted on the mobile platform 30. Although shown with six relay device bays 140, it is to be understood that the deployer 400 may comprise multiple bays 140 wherein each bay 140 is configured to stow and deploy a relay device 410. Note that the deployer 400 can be designed to host various row and column configurations of relay bays 140 (See FIG. 15 below for an example of an alternate configuration). The deployer 400 may be entirely self-powered—requiring no power from the mobile platform 30, although if desired, the mobile platform 30 may provide external power to the deployer 400. The mobile platform 30 shown in FIG. 11 is an unmanned land-based vehicle, but it is to be understood that the mobile platform 30 is not limited to unmanned land-based vehicles but may be any manned or unmanned air, land, or sea vehicle. Each wireless relay device 410 is configured to be releasably stowed in the deployer 400 such that each relay device 410 may be deployed from the deployer 400 to a support surface 120 and to operate as a node in the ad hoc telecommunications network 20. The node radio 420 is mounted to the deployer 400 and is also configured to operate as a node in the network 20 (as shown in FIG. 5). The processor 440 is mounted to the deployer 400 and operatively coupled to the node radio 420 and the deployment mechanisms 430. The node radio 420 may also be outfitted with dual antennas 450 thus enabling diversity antenna connections.

The processor 440 may comprise any number of sub-processors and/or microcontrollers configured to perform different functions. For example, in one embodiment, the node radio 420 may have its own processor that is configured to perform signal strength analysis and provide the trigger to release the relay devices 410. Continuing with the example embodiment, the node radio 420's processor may be operatively coupled to a microcontroller that may also be mounted to the deployer 400. In this embodiment, the microcontroller receives the trigger command from the node radio 420's processor and controls the deployment mechanism 430 to release the relay devices 410. The node radio 420 processor may be configured to perform a number of functions including: (1) providing an Ethernet interface to the mobile platform 30 carrying the deployer 400 to allow the mobile platform 30 to communicate with the deployer 400; (2) translating messages between Ethernet and serial, when these messages are sent to or from the deployer 400; and (3) monitoring the wireless network 20 and making a decision to release a relay device 410 before the link to the control station 40 is lost. The microcontroller in the above example may be configured to perform the following functions: (1) actuate the proper number of deployment mechanisms 430 to release a relay device 410 or alternate payload 470; (2) provide health and status messages to a user by communicating these messages to the node radio 420; (3) provide configuration parameters—some of which are obtained from the user to the relay devices 410; and (4) select the desired relay bay 140's IrDA transceiver for communicating with a relay device 410 or alternate payload 470 by providing select lines to a serial multiplexer.

Each relay bay 140 has a corresponding deployment mechanism 430 that is mounted to the deployer 400 and is configured to deploy its corresponding relay device 410. The deployment mechanism 430 may be any mechanism capable of removing the relay device 410 from the deployer 400 such that the relay device 410 comes to rest on the support surface 120. By way of example, each deployment mechanism 430 may comprise a release switch and a rail-guided, spring-loaded carriage. In operation, the processor 440 monitors the strength of the network 20 and sends a signal to one of the deployment mechanisms 430 to deploy its relay device 410 when the network 20 strength drops below a threshold value.

Figure 13A:
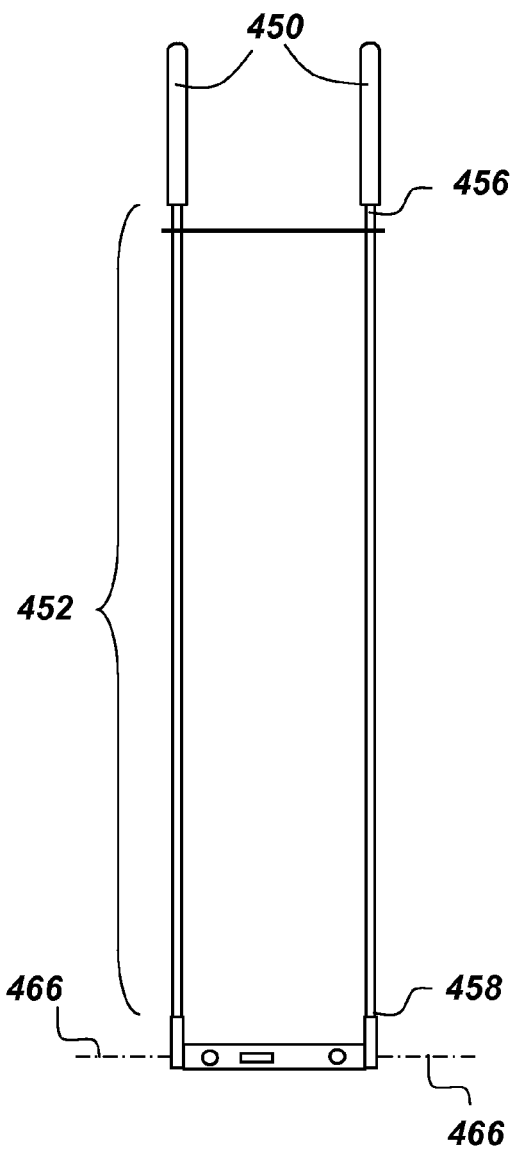
FIG. 13a shows a front view of one embodiment of the relay device.
Figure 13B:
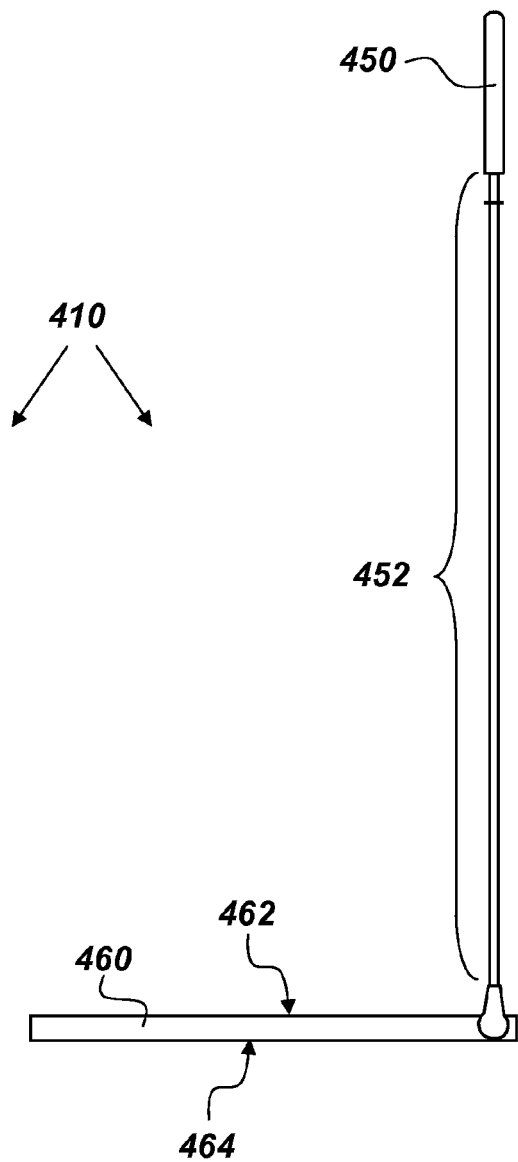
FIG. 13b shows a side view of one embodiment of the relay device.

FIGS. 13a and 13b depict front and side views respectively of one embodiment of the relay device 410. The relay device 410 comprises dual antennas 450 on rotatable antenna masts 452. Each antenna mast 452 has a distal end 456 and a proximal end 458. The antennas 450 are mechanically coupled to the distal ends 456 of the antenna masts 452, and operatively coupled to the relay device 410. The relay device 410 may be encased in a housing 460 having upper and lower surfaces 462 and 464 respectively, wherein the housing 460 is geometrically constrained to rest on either the upper surface 462 or the lower surface 464 after being deployed from the deployer 400. The proximal ends 458 of the antenna masts 452 are rotatably coupled to the housing 460 such that the axes of rotation 466 of the antenna masts 452 are parallel to the upper and lower surfaces 462 and 464.

Figure 14:
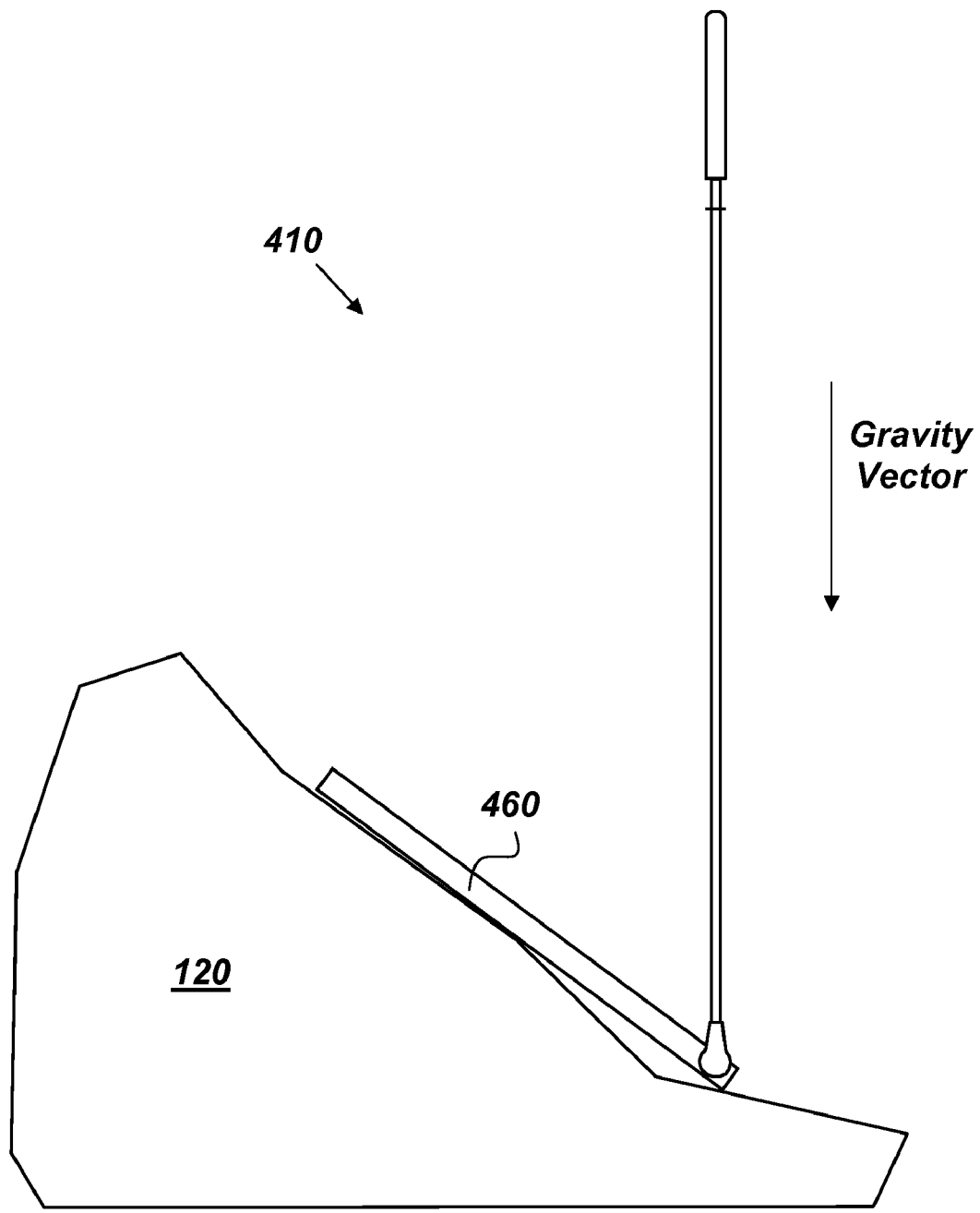
FIG. 14 shows a side view of the relay device on an uneven surface.

FIG. 14 shows a side view of the relay device 410 resting on an uneven support surface 120. An antenna mast rotation mechanism (not shown) may be mounted within the housing 460 and mechanically coupled to the proximal ends 458 of the antenna masts 452. The antenna mast rotation mechanism may be configured to upwardly rotate the antenna masts 452 from any given housing 460 position such that the antenna masts 452 are substantially parallel with the ambient gravity vector no matter the position of the housing 460.

Figure 15A:
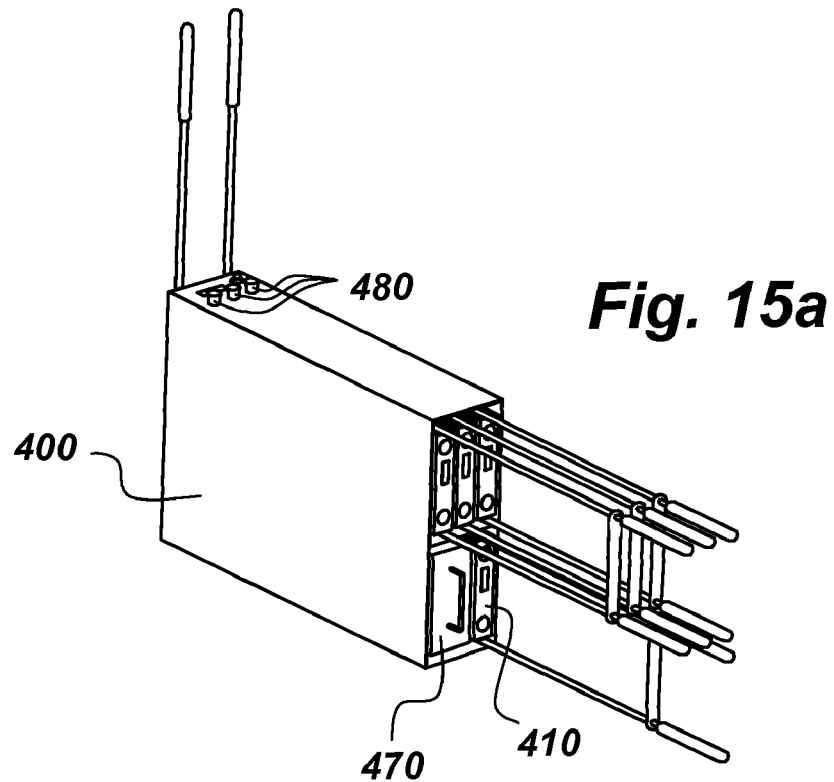
FIGS. 15a and 15b are perspective views of two alternate embodiments of the deployer.
Figure 15B:
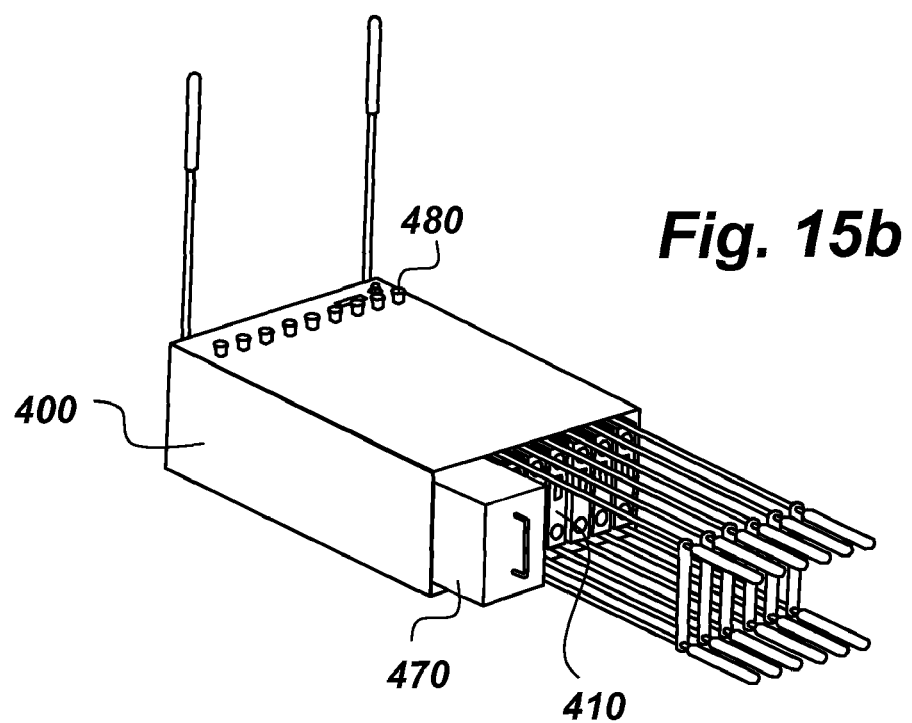

FIGS. 15a and 15b show perspective views of the deployer 400 holding alternate payloads 470. In addition to, or in lieu of, the relay devices 410, the deployer 400 may also store and deploy alternate payloads 470. Alternate payloads 470 comprise any payload other than a wireless relay device 410 that may be deployed by the deployer 400. Examples of alternate payloads 470 include, but are not limited to: electronic devices, containers filled with supplies, or explosive devices. Suitable examples of electronic devices include, but are not limited to: video cameras, sensors, motion detectors, microphones, lights, and beacons. Suitable examples of supplies include, but are not limited to food, tools, ammunition, and medical kits. Alternate payloads 470 are configured to be stowed in the relay bays 140. The deployer 400 may be configured to deploy an alternate payload 470 upon the command of a user or upon the occurrence of a trigger event. The alternate payloads 470 may be constructed to fill a single relay bay 140 or multiple relay bays 140, depending on the size, or function, of the payload. For example, in the 6-bay deployer 400 shown in FIG. 11, a single alternate payload 470 may be configured to occupy one, two, or three relay bays 140. FIG. 15a shows an alternate payload 470 that occupies two relay bays 140. FIG. 15b shows an alternate payload 470 occupying three relay bays 140. It is to be understood that the alternate payloads 470 by be any size or shape that can be deployed from the deployer 400.

While stowed, each relay device 410 may communicate with the processor 440 via a corresponding infrared data association (IrDA) transceiver (not shown) that is operatively coupled to the processor 440. Each relay bay 120 may comprise an IrDA transceiver and each relay device 410 or alternate payload may comprise a corresponding IrDA window (not shown). This communications interface is bi-directional and allows multi-byte packets to be exchanged. For example, wireless network configuration parameters may be provided to the relay device 410 by the deployer 400 to allow the relay device 410 to properly configure itself. The alternate payload 470 may also be configured to communicate its size to the deployer 400 so that the deployer 400 can actuate the proper deployment mechanisms 430. For example, if the alternate payload 470 occupies four relay bays 140, then the deployer 400 would have to activate all four of the corresponding deployment mechanisms 430 in each of the bays to deploy the alternate payload 470.

The deployer 400 may comprise manual release buttons 480 to allow a user to manually release the contents of any given relay bay 140. In one embodiment, the manual release buttons 480 may be configured to release all the relay devices 410 or alternate payloads 470 in a given column. For example, in the embodiment of the deployer 400 shown in FIG. 15a, three manual release buttons 480 are shown, each of which is configured to release the contents of the two relay bays 140 in the corresponding column. In addition to manual release buttons 480, the deployer 400 may also be configured to allow a remote user to deploy any given relay device 410 or alternate payload 470 by sending a command over the network 20.

In one embodiment, the relay device deployment system 10 may be operated by taking the following steps: Step (a) provides mounting a deployer 400 to a mobile platform 30, wherein the deployer 400 functions as a node in an ad hoc telecommunications network 20 with a base station unit 40. Step (b) provides activating one of a plurality of relay devices 410 stowed in the deployer 400 via an infrared data association (IrDA) transceiver. Step (c) provides monitoring with the deployer 400 the highest signal strength of the network 20 with a path back to the base station unit 40 apart from the signal emanating from the stowed, activated relay device 410. Step (d) involves providing configuration parameters from the deployer 400 to the activated relay device 410 via the IrDA transceiver and deploying the activated relay device 410 from the deployer 400 to a surface 120 over which the mobile platform 30 is moving when the highest signal strength of the network 20 with a path back to the base station unit 40 reaches a threshold value. Step (e) provides transmitting instructions from the deployer 400 to the deployed relay device 410 to upwardly rotate a pair of antennas 450 on the deployed relay device 410 such that the antennas 450 are substantially parallel with the ambient gravity vector. Step (f) provides repeating steps (b) through (e) until all relay devices 410 stowed in the deployer 400 have been deployed.

The method of using the relay device deployment system 10 described above may further compise step (g), which provides checking with the deployer 400 if the deployed relay device 410 entered the network 20 and if not, deactivating the deployed relay device 410 and then repeating steps (b) through (e). In addition, the method may further comprise step (h), which involves providing a warning to the base station unit 40 when all the functional relay devices 410 have been deployed and the highest signal strength of the network 20 with a path back to the base station unit 40 reaches the threshold value.

Figure 16:
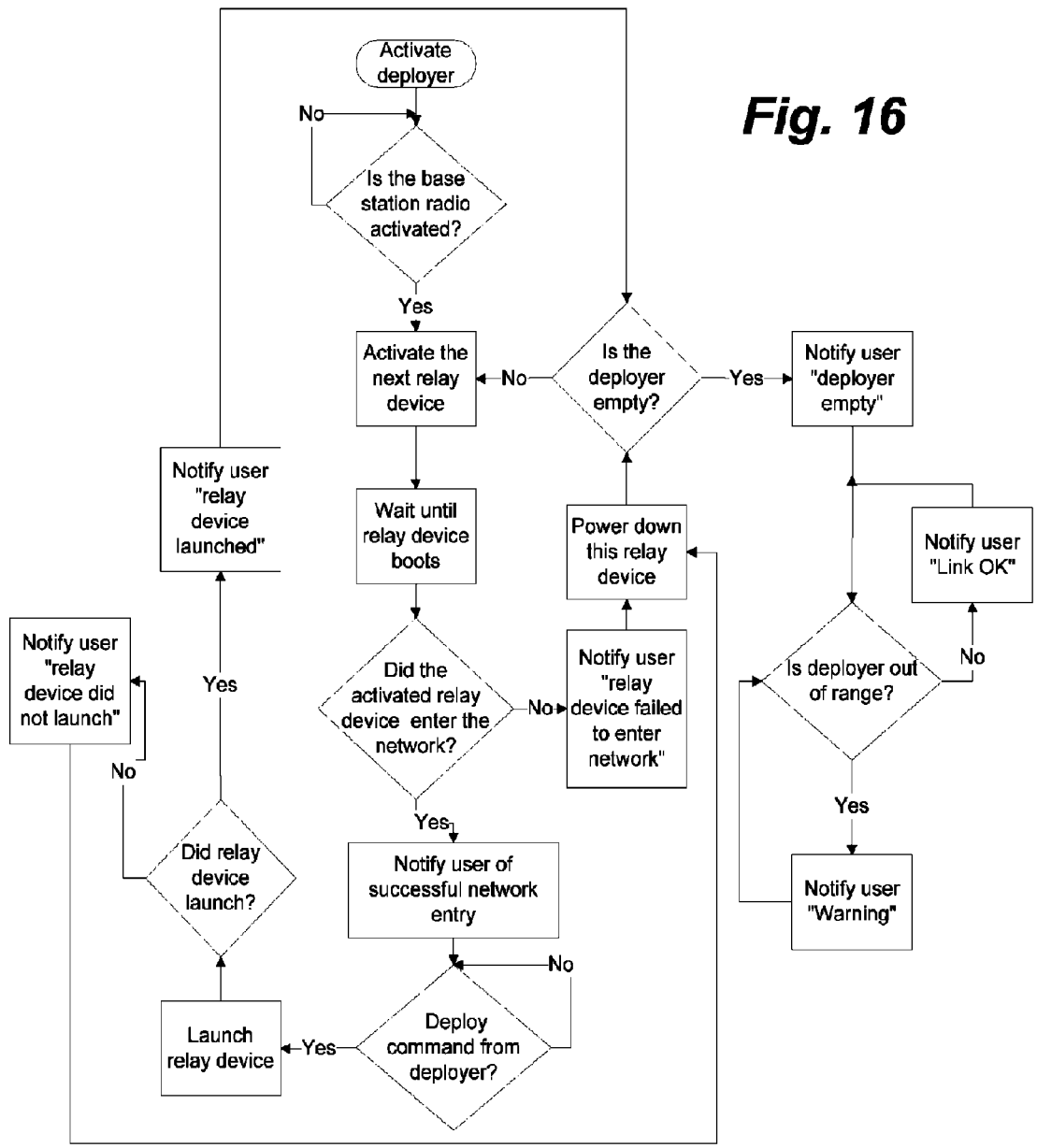
FIG. 16 is a flowchart showing how the relay device deployment system may be used.

FIG. 16 is a flowchart showing high-level operational steps that may be taken by the relay device deployment system 10. First, the user activates the deployer 400. The deployer 400 continuously checks to see if its associated base station 40 is up and running. At this point the deployer 400 is within range of the base station 40 and there is no need to deploy a relay device 410, however, the deployer 400 proceeds with activating the first relay device 410. The reason for this is to allow ample time for the relay device 410 to boot and standby for launching when the need arrives. The deployer 400 initiates the activation of a relay device 410 by sending it a command message via the IrDA interface. This command message contains network 20 configuration parameters that the relay device 410 uses to boot up and enter the network 20. Since the deployer 400 provides the network parameters to its relay devices 410 it knows exactly which relay device 410 to check to determine if in fact the relay device 410 it just activated successfully entered the network 20. Each deployer 400 can track its own relay devices 410 with substantially 100% certainty. If the just-activated relay device 410 did not enter the network 20 then the user is notified, the relay device 410 is deactivated by sending a deactivation message, and the next relay device 410 in the deployer 400 is activated if one is available. If the just-activated relay device 410 did indeed enter the network 20, the user is notified and the processor 440 waits to receive a deploy command from the radio node 420 to launch the relay device 410 that is standing by. The deploy command issued by the deployer 400 radio when the radio determines the need to release a relay device 410 to maintain the link to the base station 40. When issued, the processor 440 proceeds to launch the standby relay device 410 by sending a launch command to the corresponding deployment mechanism 430. If the relay device 410 fails to launch, the user is notified, the relay device 410 is deactivated, and the next relay device 410 in the deployer 400 is activated, if one is available. If the next relay device 410 successfully launches, the user is notified, a wireless message is sent to the just-released relay device 410 to command it to raise its antennas 450, and the next relay device 410 in the deployer 400 is activated, if one is available. This process continues until all relay devices 410 have been spent. At this point the user is notified that the deployer 400 is empty. If the mobile platform 30 proceeds beyond a point where normally a relay device 410 would be deployed, the user is warned. If the user controls the mobile platform 30 back into a safe point, the user is notified that the link is OK.

From the above description of the relay device deployment system 10, it is manifest that various techniques may be used for implementing the concepts of system 10 without departing from its scope. The described embodiments are to be considered in all respects as illustrative and not restrictive. It should also be understood that system 10 is not limited to the particular embodiments described herein, but is capable of many embodiments without departing from the scope of the claims.

We claim:

1. A method of operating a relay device deployment system comprising the following steps:
   a. mounting a deployer to a mobile platform, wherein the deployer functions as a node in an ad hoc telecommunications network with a base station unit;
   b. activating one of a plurality of relay devices stowed in the deployer via an infrared data association (IrDA) transceiver;
   c. monitoring with the deployer the highest signal strength of the network with a path back to the base station unit apart from the signal emanating from the stowed, activated relay device;
   d. providing configuration parameters from the deployer to the activated relay device via the IrDA transceiver and deploying the activated relay device from the deployer to a surface over which the mobile platform is moving when the highest signal strength of the network with a path back to the base station unit reaches a threshold value;
   e. transmitting instructions from the deployer to the deployed relay device to upwardly rotate a pair of antennas on the deployed relay device such that the antennas are substantially parallel with the ambient gravity vector; and
   f. repeating steps b through e until all relay devices stowed in the deployer have been deployed.

2. The method of claim 1, wherein the mobile platform is unmanned.

3. The method of claim 2, further comprising:
   g. checking with the deployer if the deployed relay device entered the network and if not, deactivating the deployed relay device and repeating steps b through e.

4. The method of claim 3, further comprising:
   h. providing a warning to the base station unit when all the functional relay devices have been deployed and the highest signal strength of the network with a path back to the base station unit reaches the threshold value.

* * * * *